(12) United States Patent
Bauer et al.

(10) Patent No.: US 6,297,323 B1
(45) Date of Patent: Oct. 2, 2001

(54) POLYMER MIXTURE

(75) Inventors: Peter Bauer, Ludwigshafen; Martin Lux, Dannstadt-Schauernheim; Dieter Lilge, Limburgerhof, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/424,909

(22) PCT Filed: May 20, 1998

(86) PCT No.: PCT/EP98/02948

§ 371 Date: Dec. 1, 1999

§ 102(e) Date: Dec. 1, 1999

(87) PCT Pub. No.: WO98/55546

PCT Pub. Date: Dec. 10, 1998

(30) Foreign Application Priority Data

Jun. 2, 1997 (DE) ................................................ 197 23 003

(51) Int. Cl.⁷ ...................................................... C08L 23/16
(52) U.S. Cl. ............................................ 525/191; 525/240
(58) Field of Search ...................................... 525/191, 240

(56) References Cited

U.S. PATENT DOCUMENTS

| 4,587,303 | 5/1986 | Turtle . |
|---|---|---|
| 4,794,096 | 12/1988 | Ewen . |
| 4,857,613 | 8/1989 | Zolk et al. . |
| 5,363,915 | 11/1994 | Marquis et al. . |
| 5,371,260 | 12/1994 | Sangokoya . |
| 5,391,793 | 2/1995 | Marks et al. . |

FOREIGN PATENT DOCUMENTS

| 2173775 | 10/1996 | (CA) . |
|---|---|---|
| 195 29 240 | 2/1997 | (DE) . |
| 284 708 | 10/1988 | (EP) . |
| 575 123 | 12/1993 | (EP) . |
| 621 279 | 10/1994 | (EP) . |
| 633 264 | 11/1995 | (EP) . |
| 91/09882 | 7/1991 | (WO) . |
| 95/10566 | 4/1995 | (WO) . |
| 95/27005 | 10/1995 | (WO) . |

OTHER PUBLICATIONS

J. Org. Chem. vol. 369, 1989, Wiesenfeldt et al., 359–370.
Advances in Catalysis, vol. 33, 1984, McDaniel, 47–98.
2244 Research Discl. 1995 Aug. No. 3786, Emsworth, GB.
Ullmann's Ency. Ind. Chem, Fifth, vol. A21 502–504.

Primary Examiner—Nathan M. Nutter
(74) Attorney, Agent, or Firm—Keil & Weinkauf

(57) ABSTRACT

Polymer blends contain at least 85% by weight of ethylene/α-olefin copolymers (A) prepared by metallocene catalysis and from 1 to 15% by weight of essentially linear ethylene/α-olefin copolymers (B) prepared using another catalyst, the percentages in each case being based on the total weight of the polymer blend.

9 Claims, No Drawings

POLYMER MIXTURE

This application claims foreign priority under 35 U.S.C. §119 of Germany 19723003.2. This application claims priority under 35 USC 371 of PCT/EP/98/02948 filed May 20, 1998.

The present invention relates to polymer blends containing at least 85% by weight of ethylene/α-olefin copolymers (A) prepared by metallocene catalysis and from 1 to 15% by weight of essentially linear ethylene/α-olefin copolymers (B) prepared using another catalyst, the percentages in each case being based on the total weight of the polymer blend.

The present invention furthermore relates to the use of these polymer blends for the production of films and to films which contain these polymer blends.

Ethylene/α-olefin copolymers which are prepared by metallocene catalysis have some advantageous properties compared with copolymers prepared by means of conventional catalyst systems. Thus, the metallocene copolymers are often superior in their mechanical properties, such as toughness, compared with copolymers of similar composition prepared by a different method. The excellent mechanical properties make metallocene copolymers appear particularly suitable for the production of films. Especially for the production of films, high requirements are also set with regard to the optical properties of the polymers used. In the case of pure metallocene copolymers, as well as in conventionally prepared LLDPE, a slight haze and insufficient gloss are often evident.

In order to improve the optical properties of LLDPE copolymers, these copolymers are mixed with other polymers. U.S. Pat. No. 4,587,303 describes a polymer blend comprising LLDPE and LDPE or ethylene copolymers obtained by high-pressure free radical polymerization processes. These high-pressure polymers are distinguished by long-chain branches, giving rise to, inter alia, their low density. WO 95/27005 describes a polymer blend of LLDPE, which was prepared by metallocene catalysis, and low density polyethylene. It is true that the stated polymer blends have improved optical properties compared with pure metallocene copolymers. However, this improvement is accompanied by a dramatic deterioration in the mechanical properties.

It is an object of the present invention to provide polymer blends which are based on ethylene/α-olefin copolymers prepared by metallocene catalysis and which, on the one hand, have better optical properties than pure metallocene copolymers and, on the other hand, exhibit good mechanical properties.

We have found that this object is achieved by the polymer blends stated at the outset, their use for the production of films, and films which contain these polymer blends.

Suitable copolymers (A) are in principle all ethylene/α-olefin copolymers prepared by metallocene catalysis.

The polymerization can be carried out, for example, in the gas phase, in suspension, in solution or in the high-pressure process, the catalyst system used in the suspension or gas-phase process preferably being one which contains
  a) an inorganic or organic carrier,
  b) a metallocene complex and
  c) a compound forming metallocenium ions.

Preferably used carrier materials a) are finely divided carriers which preferably have a particle diameter of from 1 to 300 μm, in particular from 30 to 70 μm. Suitable inorganic carriers are, for example, magnesium chloride or silica gels, preferably those of the formula $SiO_2 \cdot a\, Al_2O_3$, where a is from 0 to 2, preferably from 0 to 0.5; these are therefore aluminosilicates or silica. Such products are commercially available, for example Silica Gel 332 from Grace. Suitable organic carriers are, for example, finely divided polyolefins, for example finely divided polypropylene.

The amount of carrier is preferably from 50 to 99.9% by weight, based on the total weight of carrier and metallocene complex (component b).

Particularly suitable metallocene complexes b) are those of the general formula I

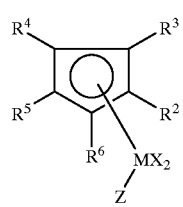

where

M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl, alkylaryl having 1 to 10 carbon atoms in the alkyl radical and 6 to 20 carbon atoms in the aryl radical, —$OR^7$ or —$NR^7R^8$, $R^7$ and $R^8$ are each $CH_1$–$C_{10}$-alkyl, $C_6$–$C_{15}$-aryl, alkylaryl, arylalkyl, fluoroalkyl or fluoroaryl, each having 1 to 10 carbon atoms in the alkyl radical and 6 to 20 carbon atoms in the aryl radical, $R^2$ to $R^6$ are each hydrogen, $C_1$–$C_{10}$-alkyl, 5- to 7-membered cycloalkyl which in turn may carry $C_1$–$C_{10}$-alkyl as substituent, $C_6$–$C_{15}$-aryl or arylalkyl, where, if desired, two neighboring radicals together may furthermore be a saturated or unsaturated cyclic group of 4 to 15 carbon atoms, or $Si(R^9)_3$, $R^9$ is $C_1$–$C_{10}$-alkyl, $C_3$–$C_{10}$-cycloalkyl or $C_6$–$C_{15}$-aryl,

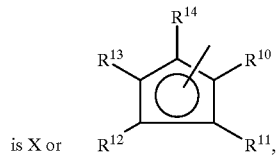

is X or $R^{10}$ to $R^{14}$ are each hydrogen, $C_1$–$C_{10}$-alkyl, 5- to 7-membered cycloalkyl which in turn may carry $C_1$–$C_{10}$-alkyl as a substituent, $C_6$–$C_{15}$-aryl or arylalkyl, where, if desired, two neighboring radicals together may furthermore be a saturated or unsaturated cyclic group of 4 to 15 carbon atoms, or $Si(R^{15})_3$, $R^{15}$ is $C_1$–$C_{10}$-alkyl, $C_6$–$C_{15}$-aryl or $C_3$–$C_{10}$-cycloalkyl, or $R^5$ and Z together form a group —$R^{16}$—A—,

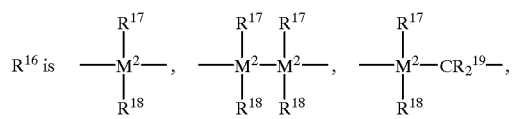

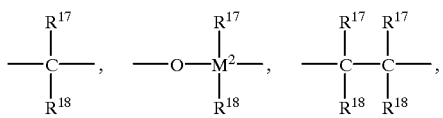

$=BR^{17}$, $=AlR^{17}$, $-Ge-$, $-Sn-$, $-O-$, $-S-$, $=SO$, $=SO_2$, $=NR^{17}$, $=CO$, $=PR^{17}$ or $=P(O)R^{17}$, $R^{17}$, $R^{18}$ and $R^{19}$ are identical or different and are each hydrogen, halogen, $C_1-C_{10}$-alkyl, $C_1-C_{10}$-fluoroalkyl, $C_6-C_{10}$-fluoroaryl, $C_6-C_{10}$-aryl, $C_1-C_{10}$-alkoxy, $C_2-C_{10}$-alkenyl, $C_7-C_{40}$-arylalkyl, $C_8-C_{40}$-arylalkenyl or $C_7-C_{40}$-alkylaryl, or two neighboring radicals in each case, together with the atoms linking them, form a ring, and $M^2$ is silicon, germanium or tin,

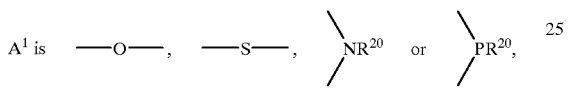

$R^{20}$ is $C_1-C_{10}$-alkyl, $C_6-C_{15}$-aryl, $C_3-C_{10}$-cycloalkyl, alkylaryl or $Si(R^{21})_3$, $R^{21}$ is hydrogen, $C_1-C_{10}$-alkyl, $C_6-C_{15}$-aryl, which in turn may be substituted by $C_1-C_4$-alkyl, or $C_3-C_{10}$-cycloalkyl or $R^5$ and $R^{13}$ together form a group $-R^{16}-$.

Among the metallocene complexes of the general formula I,

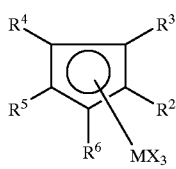
Ia

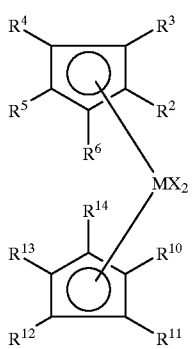
Ib

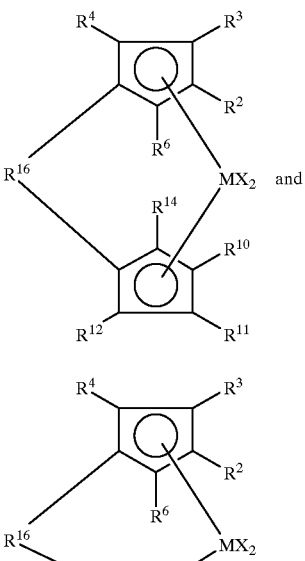
Ic and Id are preferred.

Particularly preferred transition metal complexes are those which contain, as ligands, two aromatic ring systems linked to one another by a bridge, ie. the transition metal complexes of the general formula Ic.

The radicals X may be identical or different but are preferably identical.

Among the compounds of the formula Ia, those in which
  M is titanium, zirconium or hafnium,
  X is chlorine, $C_1-C_4$-alkyl or phenyl and
  $R^2$ to $R^6$ are each hydrogen or $C_1-C_4$-alkyl are preferred.

Examples of preferred compounds of the formula Ib are those in which
  M is titanium, zirconium or hafnium,
  X is chlorine, $C_1-C_4$-alkyl or phenyl,
  $R^2$ to $R^6$ are each hydrogen, $C_1-C_4$-alkyl or $Si(R^9)_3$,
  $R^{10}$ to $R^{14}$ are each hydrogen, $C_1-C_4$-alkyl or $Si(R^{15})_3$.

The compounds of the formula Ib in which the cyclopentadienyl radicals are identical are particularly suitable.

Examples of particularly suitable compounds include: bis(cyclopentadienyl)zirconium dichloride, bis (pentamethylcyclopentadienyl)zirconium dichloride, bis (methylcyclopentadienyl)zirconium dichloride, bis (ethylcyclopentadienyl)zirconium dichloride, bis(n-butylcyclopentadienyl)zirconium dichloride and bis (trimethylsilylcyclopentadienyl)zirconium dichloride and the corresponding dimethylzirconium compounds.

Particularly suitable compounds of the formula Ic are those in which
  $R^2$ and $R^{10}$ are identical and are each hydrogen or $C_1-C_{10}$-alkyl,
  $R^6$ and $R^{14}$ are identical and are each hydrogen, methyl, ethyl, isopropyl or tert-butyl,
  $R^4$ and $R^{12}$ are each $C_1-C_4$-alkyl
  $R^3$ and $R^{11}$ are each hydrogen or two neighboring radicals $R^3$ and $R^4$ on the one hand and $R^{11}$ and $R^{12}$ on the other hand together are a cyclic group of 4 to 12 carbon atoms, $R^{16}$ is 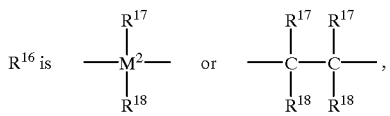, M is titanium, zirconium or hafnium and X is chlorine, $C_1$–$C_4$-alkyl or phenyl.

Examples of particularly suitable complex compounds include dimethylsilanediylbis(cyclopentadienyl)zirconium dichloride, dimethylsilanediylbis(indenyl)zirconium dichloride, dimethylsilanediylbis(tetrahydroindenyl)zirconium dichloride, ethylenebis(cyclopentadienyl)zirconium dichloride, ethylenebis(indenyl)zirconium dichloride, ethylenebis(tetrahydroindenyl)zirconium dichloride, tetramethylethylene-9-fluorenylcyclopentadienylzirconium dichloride, dimethylsilanediylbis(3-tert-butyl-5-methylcyclopentadienyl)-zirconium dichloride, dimethylsilanediylbis(3-tert-butyl-5-ethylcyclopentadienyl)-zirconium dichloride, dimethylsilanediylbis(2-methylindenyl)zirconium dichloride, dimethylsilanediylbis(2-isopropylindenyl)zirconium dichloride, dimethylsilanediylbis(2-tert-butylindenyl)zirconium dichloride, diethylsilanediylbis(2-methylindenyl)zirconium dibromide, dimethylsilanediylbis(3-methyl-5-methylcyclopentadienyl)-zirconium dichloride, dimethylsilanediylbis(3-ethyl-5-isopropylcyclopentadienyl)-zirconium dichloride, dimethylsilanediylbis(2-methylindenyl)zirconium dichloride, dimethylsilanediylbis(2-methylbenzindenyl)zirconium dichloride, dimethylsilanediylbis(2-ethylbenzindenyl)zirconium dichloride, methylphenylsilanediylbis(2-ethylbenzindenyl)zirconium dichloride, methylphenylsilanediylbis(2-methylbenzindenyl)zirconium dichloride, diphenylsilanediylbis(2-methylbenzindenyl)zirconium dichloride, diphenylsilanediylbis(2-ethylbenzindenyl)zirconium dichloride, and dimethylsilanediylbis(2-methylindenyl)hafnium dichloride and the corresponding dimethylzirconium compounds.

Examples of particularly suitable compounds of the general formula Id are those in which M is titanium or zirconium, X is chlorine, $C_1$–$C_4$-alkyl or phenyl, $R^{16}$ is 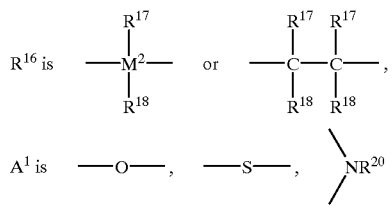

$A^1$ is —O—, —S—, $\diagdown$NR$^{20}$ / and $R^2$ to $R^4$ and $R^6$ are each hydrogen, $C_1$–$C_{10}$-alkyl, $C_3$–$C_{10}$-cycloalkyl, $C_6$–$C_{15}$-aryl or Si(R$^9$)$_3$, or two neighboring radicals are a cyclic group of 4 to 12 carbon atoms.

The synthesis of such complex compounds can be carried out by methods known per se, the reaction of the appropriately substituted, cyclic hydrocarbon anions with halides of titanium, zirconium, hafnium, vanadium, niobium or tantalum being preferred.

Examples of appropriate preparation processes are described, inter alia, in Journal of Organometallic Chemistry, 369 (1989), 359–370.

Mixtures of different metallocene complexes may also be used.

Suitable compounds c) forming metallocenium ions are strong, neutral Lewis acids, ionic compounds having Lewis acid cations and ionic compounds having Bronsted acids as cations.

Preferred strong, neutral Lewis acids are compounds of the general formula II $$M^3X^1X^2x^3 \qquad \text{II}$$

where $M^3$ is an element of main group III of the Periodic Table, in particular B, Al or Ga, preferably B, $X^1$, $X^2$ and $X^3$ are each hydrogen, $C_1$–$C_{10}$-alkyl, $C_6$–$C_{15}$-aryl, alkylaryl, arylalkyl, haloalkyl or haloaryl, each having 1 to 10 carbon atoms in the alkyl radical and 6 to 20 carbon atoms in the aryl radical, or fluorine, chlorine, bromine or iodine, in particular haloaryl, preferably pentafluorophenyl.

Particularly preferred compounds of the general formula II are those in which $X^1$, $X^2$ and $X^3$ are identical, tris(pentafluorophenyl)borane being preferred.

Suitable ionic compounds having Lewis acid cations are compounds of the general formula III $$[(Y^{a+})Q_1Q_2\ldots Q_z]^{d+} \qquad \text{II}$$

where

Y is an element of main group I to VI or of subgroup I to VIII of the Periodic Table, $Q_1$ to $Q_z$ are each radicals having a single negative charge, such as $C_1$–$C_{28}$-alkyl, $C_6$–$C_{15}$-aryl, alkylaryl, arylalkyl, haloalkyl or haloaryl, each having 6 to 20 carbon atoms in the aryl radical and 1 to 28 carbon atoms in the alkyl radical, $C_1$–$C_{10}$-cycloalkyl which is unsubstituted or substituted by $C_1$–$C_{10}$-alkyl, or halogen, $C_1$–$C_{28}$-alkoxy, $C_6$–$C_{15}$-aryloxy, silyl or mercaptyl, a is an integer from 1 to 6, z is an integer from 0 to 5 and d corresponds to the difference a-z, but d is greater than or equal to 1.

Carbonium cations, oxonium cations and sulfonium cations and cationic transition metal complexes are particularly suitable. Particular examples are the triphenylmethyl cation, the silver cation and the 1,1'-dimethylferrocenyl cation. They preferably have noncoordinating opposite ions, in particular boron compounds as also stated in WO 91/09882, preferably tetrakis(pentafluorophenyl)borate.

Ionic compounds having Bronsted acids as cations and preferably also noncoordinating opposite ions are stated in WO 91/09882, a preferred cation being N,N-dimethylanilinium.

Particularly preferred compounds forming metallocenium ions are open-chain or cyclic aluminoxane compounds of the general formula IV or V

IV

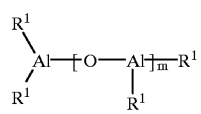

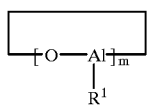

where
R[1] is $C_1$–$C_4$-alkyl, preferably methyl or ethyl, and m is an integer from 5 to 30, preferably from 10 to 25.

The preparation of these oligomeric aluminoxane compounds is usually carried out by reacting a solution of a trialkylaluminum with water and is described, inter alia, in EP-A 284 708 and U.S. Pat. No. 4,794,096.

As a rule, the oligomeric aluminoxane compounds obtained are in the form of mixtures of both linear and cyclic chain molecules of different lengths, so that m is to be regarded as an average value. The aluminoxane compounds may also be present as a mixture with other metal alkyls, preferably with alkylaluminums.

Furthermore, aryloxyaluminoxanes, as described in U.S. Pat. No. 5,391,793, aminoaluminoxanes, as described in U.S. Pat. No. 5,371,260, aminoaluminoxane hydrochlorides, as described in EP-A 633 264, silyloxyaluminoxanes, as described in EP-A 621 279, or mixtures thereof may be used as compounds forming metallocenium ions.

The copolymers A) which can preferably be prepared by means of the stated catalyst systems preferably contain from 97 to 75% by weight of ethylene units and from 3 to 25% by weight of $C_3$–$C_{20}$-α-olefin units, based in each case on the total weight of the component A). Particularly preferably, these copolymers contain from 97 to 85% by weight of ethylene units and from 3 to 15% by weight of $C_3$–$C_{20}$-α-olefin units.

Suitable $C_3$–$C_{20}$-α-olefins which serve as comonomers of these copolymers are all linear or branched α-isomers of propene, butene, pentene, hexene, heptene, octene, nonene, decene, undecene, dodecene, tridecene, tetradecene, pentadecene, hexadecene, heptadecene, octadecene, nonadecene and eicosene.

Preferred $C_3$–$C_{20}$-α-olefin comonomers are those selected from the group consisting of butene, pentene, hexene, 4-methylpentene and octene, particularly preferably butene, pentene and hexene.

Particularly preferred copolymers (A) are ethylene/butene copolymers having a butene content of 4–8% by weight and ethylene/hexene copolymers having a hexene content of 4–8% by weight, based in each case on the total weight of thee copolymers.

Other preferred copolymers (A) are those which have a molecular weight distribution $M_w/M_n < 3.5$.

Furthermore, copolymers (A) having a density of 0.91–0.925 and an HLMI (High Load Meltflow Index) of 10–40 g/10 min are particularly advantageous for use in films.

Suitable copolymers (B) are all essentially linear ethylene/α-olefin copolymers as prepared using other catalysts, ie. non-metallocene catalysts.

Particular examples are medium density ethylene copolymers (MDPE) having a density of from 0.930 to 0.940, in particular those MDPE copolymers prepared by means of chromium catalysts. Such chromium catalysts, also referred to as Phillips catalysts, are generally known (cf. for example M. P. McDaniel, Adv. Cat 33, (1985) 47–98 and U.S. Pat. No. 5,363,915). These copolymers may contain the above-mentioned $C_3$–$C_{20}$-α-olefins as comonomers, here too hexene and butene being preferred, in particular hexene.

The MDPE copolymers preferably have an HLMI of 2–100, particularly preferably 10–30 g/10 min.

Other examples of copolymers (B) are LLDPE copolymers having a density of from 0.915 to 0.929, in particular those prepared using a Ziegler catalyst. Conventional catalysts of this type are described, for example, in Ullmann's Encyclopedia of Industrial Chemistry, Vol. A 21, 4th edition 1992, page 502 et seq. Catalysts as described in, for example, U.S. Pat. No. 4857613 and DE-A-19 529 240 should be mentioned in particular here.

The LLDPE copolymers obtainable by means of Ziegler catalysis can be prepared by all conventional polymerization processes, solution processes and gas-phase processes being particularly preferred, in particular gas-phase fluidized-bed processes. These copolymers in turn may contain the above-mentioned α-olefins, preferably butene, hexene or octene, as comonomers.

In addition to the copolymers (A) and (B), the novel polymer blends may contain further additives, such as light stabilizers and stabilizers against the effects of weathering, processing assistants and, if desired, dyes. The type and amount of these additives are familiar to a person skilled in the art.

The novel polymer blends contain the copolymer component (B) in a concentration of 1–15, preferably 2–10, % by weight, based on the total weight of the polymer blend.

The copolymer components (A) and (B) can be mixed by any known mixing method. Usually, the polymer components in the form of coarse powder, if desired together with further additives, are mixed in a twin-screw extruder (ZSK) in the desired ratios and processed to give granules. These granules can then be processed to films, for example in blown film units.

The novel polymer blends are very suitable for the production of films, in particular for the packaging sector and especially for the packaging of foods. The films obtained are distinguished by transparency, gloss and good mechanical properties, in particular by high tensile strength. They have little tendency to block and are therefore convenient to process. The Examples which follow illustrate the invention.

EXAMPLES

The following ethylene copolymers were prepared in a loop reactor by suspension polymerization using a supported metallocene catalyst:

| Copolymer A1 Ethylene/hexene copolymer | | |
|---|---|---|
| HLMI | 27.4 g/10' | Mw 126 000 g/mol |
| Density | 0.916 g/cm³ | Mn 51 000 g/mol |
| Hexene content | 5.5% by weight | Mw/Mn 2.47 |
| Copolymer A2: Ethylene/butene copolymer | | |
| HLMI | 26.0 g/10' | Mw 111 000 g/mol |
| Density | 0.919 g/cm³ | Mn 43 000 g/mol |
| Butene content | 6.3% by weight | Mw/Mn 2.58 |

The following linear ethylene copolymers prepared using conventional catalysts were provided as component (B) of the mixture:

Copolymer B1

MDPE, prepared by Phillips catalysis with hexene as comonomer (Lupolen® 3821 D, manufacturer: Rheinische Olefinwerke, wesseling, Germany)

| HLMI | 20 g/10' |
|---|---|
| Density | 0.938 g/cm³ |

Copolymer B2

LLDPE, prepared using a Ziegler catalyst in a solution process with octene as comonomer (Dowlex® 2045, manufacturer: Dow Chemicals)

| HLMI | 31 g/10' |
|---|---|
| Density | 0.921 g/cm³ |

Copolymer B3

LLDPE, prepared using a Ziegler catalyst in a gas-phase fluidized-bed process with hexene as comonomer (Escorene® 3108, manufacturer: Exxon)

| HLMI | 22 g/10' |
|---|---|
| Density | 0.923 g/cm³ |

Copolymer B4

LLDPE, prepared using a Ziegler catalyst in a gas-phase fluidized-bed process with hexene as comonomer (Lupolex® 2820 G, manufacturer: Rheinische Olefinwerke)

| HLMI | 23 g/10' |
|---|---|
| Density | 0.928 g/cm³ |

Copolymer B5

LLDPE, prepared using a Ziegler catalyst in a gas-phase fluidized-bed process with butene as comonomer (Escorene® LL 1001, manufacturer: Exxon)

| HLMI | 26 g/10' |
|---|---|
| Density | 0.919 g/cm³ |

The blends stated in the Table were prepared in a ZSK from the polymer components in the form of coarse powders. 50 μm thick films were produced from the resulting granules in a 30 mm Troester blown film unit (die 50 mm, die gap 2 mm, temperature profile 180, 190, 200, 3×210° C., output 5 kg/h, blow-up ratio 2:1).

The Table provides information about the tests performed and the properties of the films produced. (All percentages are by weight, based on the total amount of the polymer blend.)

TABLE

Testing of the blown films produced

| Example | Blend | Haze ISO 6427 | Gloss ISO 2813 >20° % | Co-efficient of friction DIN 67530 | Blocking force DIN 53366 N | Dart Drop ASTM D 1709 g | Tensile strength longitudinal/ transverse ISO 527 N/mm² | Elongation at break longitudinal/ transverse ISO 527 % |
|---|---|---|---|---|---|---|---|---|
| 1 | 98% A1 + 2% B1 | 9 | 72 | 258 | 50 | 609 | 56/53 | 787/808 |
| 2 | 95% A1 + 5% B1 | 7 | 83 | 236 | 49 | 664 | 58/55 | 784/833 |
| 3 | 90% A1 + 10% B1 | 7 | 77 | 161 | 17 | 611 | 58/54 | 798/838 |
| 4 | 90% A2 + 10% B1 | 8 | 68 | 133 | 0 | 163 | 43/37 | 913/951 |
| 5 | 95% A1 + 5% B2 | 11 | 46 | 273 | 49 | 1212 | 54/53 | 750/839 |
| 6 | 90% A1 + 10% B2 | 13 | 42 | 264 | 44 | 1060 | 56/49 | 794/800 |
| 7 | 85% A1 + 15% B2 | 13 | 46 | 251 | 43 | 990 | 55/52 | 780/814 |
| 8 | 90% A1 + 10% B3 | 7 | 83 | 260 | 79 | 525 | 55/55 | 788/831 |
| 9 | 95% A1 + 5% B4 | 6 | 85 | 254 | 73 | 501 | 52/54 | 795/813 |
| 10 | 90% A1 + 10% B4 | 9 | 85 | 254 | 84 | 610 | 57/54 | 790/819 |
| 11 | 90% A2 + 10% B4 | 9 | 59 | 214 | 22 | 183 | 39/36 | 898/924 |
| 12 | 90% A2 + 10% B5 | 12 | 52 | 228 | 31 | 174 | 39/38 | 948/982 |
| Comparative | 100% A1 (40 μm) | 14 | 33 | —* | —** | >1430 | 68/60 | 766/793 |

TABLE-continued

Testing of the blown films produced

| Example | Blend | Haze ISO 6427 | Gloss ISO 2813 >20° % | Co-efficient of friction DIN 67530 | Blocking force DIN 53366 N | Dart Drop ASTM D 1709 g | Tensile strength longitudinal/ transverse ISO 527 N/mm$^2$ | Elongation at break longitudinal/ transverse ISO 527 % |
|---|---|---|---|---|---|---|---|---|
| Example 1 Comparative Example 2 | 100% A2 (40 μm) | 29 | 16 | —* | —** | 172 | 43/41 | 894/987 |

*too high to measure
**too high to measure (>200 N)

We claim:

1. A polymer blend containing at least 85% by weight of ethylene/α-olefin copolymers (A) prepared by metallocene catalysis and from 1 to 15% by weight of essentially linear ethylene/α-olefin copolymers (B) prepared using a Ziegler or chromium catalyst, the percentages in each case being based on the total weight of the polymer blend.

2. A polymer blend as claimed in claim 1, wherein ethylene/hexene copolymers having a hexene content of 4–8% by weight, based on the total weight of these copolymers, are present as copolymers (A).

3. A polymer blend as claimed in claim 1, wherein ethylene/butene copolymers having a butene content of 4–8% by weight, based on the total weight of these copolymers, are present as copolymers (A).

4. A polymer blend as claimed in claim 1, wherein MDPE copolymers having a density of from 0.93 to 0.94 are present as copolymers (B).

5. A polymer blend as claimed in claim 4, wherein the MDPE copolymers are prepared using a chromium catalyst.

6. A polymer blend as claimed in claim 1, wherein LLDPE copolymers having a density of from 0.915 to 0.929 are present as copolymers (B).

7. A polymer blend as claimed in claim 6, wherein the LLDPE copolymers are prepared using a Ziegler catalyst.

8. A process for producing films comprising the step of incorporating into a film polymer blend as claimed in claim 1.

9. A film containing a polymer blend containing at least 85% by weight of ethylene/α-olefin copolymers (A) prepared by metallocene catalysis and from 1 to 15% by weight of essentially linear ethylene/α-olefin copolymers (B) prepared using another catalyst, the percentages in each case being based on the total weight of the polymer blend.

* * * * *